United States Patent [19]

de Gyarfas et al.

[11] Patent Number: 5,286,202

[45] Date of Patent: Feb. 15, 1994

[54] TRAINER USING VIDEO PHOTOGRAPHS AND OVERLAYS FOR RECONFIGURABLE HARDWARE SIMULATION

[75] Inventors: Victor S. de Gyarfas; Randy Saunders, both of Upland, Calif.

[73] Assignee: Hughes Training, Inc., Arlington, Tex.

[21] Appl. No.: 995,569

[22] Filed: Dec. 22, 1992

Related U.S. Application Data

[63] Continuation of Ser. No. 605,621, Oct. 30, 1990, abandoned.

[51] Int. Cl.$^5$ .............................................. G09B 9/00
[52] U.S. Cl. ........................................ 434/43; 434/29;
 434/219; 434/365; 273/434; 395/135; 345/121; 348/123
[58] Field of Search ........................ 434/23, 24, 29, 30,
 434/35, 38, 43, 44, 219, 307, 308, 322, 336, 350,
 365, 372; 273/85 G, 434, DIG. 28; 358/92, 104,
 229, 241, 254; 340/706-709, 712, 717, 724;
 385/135, 155, 156, 159, 160, 161; 244/118.5, 1
 R; 73/866.1, 866.3

[56] References Cited

U.S. PATENT DOCUMENTS

| | | | |
|---|---|---|---|
| 4,529,150 | 7/1985 | Owen et al. .......................... 244/1 R |
| 4,587,630 | 6/1986 | Straton et al. .................. 340/712 X |
| 4,609,358 | 9/1986 | Sangster ......................... 434/336 X |
| 4,641,255 | 2/1987 | Hohmann ....................... 358/104 X |
| 4,672,438 | 6/1987 | Plante et al. ......................... 358/104 |
| 4,695,827 | 9/1987 | Beining et al. .................. 340/712 X |
| 4,698,624 | 10/1987 | Barker et al. .................... 400/76 X |
| 4,715,818 | 12/1987 | Shapiro et al. ................. 434/350 X |
| 4,845,645 | 7/1989 | Matin ............................. 395/155 X |
| 4,891,633 | 1/1990 | Imazeki et al. ..................... 340/717 |
| 5,019,961 | 5/1991 | Addesso et al. ................ 364/578 X |
| 5,119,079 | 6/1992 | Hube et al. .......................... 340/712 |

OTHER PUBLICATIONS

"MacinTosh ® System Software User's Guide Version 6.0" by Apple Computer, Inc., 1988.

*Primary Examiner*—Richard J. Apley
*Assistant Examiner*—Joe Cheng
*Attorney, Agent, or Firm*—Wanda K. Denson-Low

[57] ABSTRACT

A system (10) for simulating an operating environment, such as aircraft cockpit for use in training. The system (10) includes a video storage device (46) for storing and transmitting an image of the operating environment. The video storage device (46) is coupled to a video monitor (58) for displaying the stored image. A graphics generator (54) generates an overlay image simulating the appearance of displays and manipulable controls in the operating environment in a plurality of its manipulative states. The graphics overlays may be manipulated by means of a touch sensitive screen (64) to simulate the operation of the manipulable controls. The system also includes an interactive system (12) for authoring and editing the overlays as well as the simulation process.

20 Claims, 8 Drawing Sheets

TRAINER USING VIDEO PHOTOGRAPHS AND OVERLAYS FOR RECONFIGURABLE HARDWARE SIMULATION

This is a continuation of application Ser. No. 605,621, filed Oct. 30, 1990, now abandoned.

CROSS REFERENCE TO RELATED APPLICATION

This invention contains material related to the co-pending patent application Ser. No. 07/605,620, filed Oct. 30, 1990, entitled "Learn Mode Courseware Tool", which is assigned to the same assignee as the present application.

BACKGROUND OF THE INVENTION

1. Technical Field

This invention relates to training systems, and more particularly to an interactive reconfigurable simulator and training system.

2. Discussion

Complex human operated systems often place great demands on their operators. Consequently, the training these operators require can demand a significant investment to achieve the desired level of skill and proficiency. Examples of such systems having high training costs include sophisticated stationary process control systems, as well as ground and airborne vehicles.

In most of these types of systems, the expense of using actual hardware for the bulk of the training process is prohibitive. Consequently, simulators have been developed to simulate the operating environment in many of these systems to permit low cost extensive training experience for prospective operators. For example, in pilot training, it is common to use hardware mockups of an aircraft cockpit coupled with a computer generated simulated view of the exterior terrain to give new pilots an experience with the myriad controls and situations with which they must be familiar with to operate the actual aircraft.

While such simulators are much less expensive than using an actual system for training, hardware mockups are still relatively expensive to construct. Moreover, in many systems design changes are ongoing and frequent. As a result, a hardware mockup may quickly become obsolete and must then be modified or reconstructed at considerable cost.

Thus, it would be desirable to provide a training simulator which is relatively inexpensive. Further it would be desirable to provide a training simulator which provides a realistic simulation of an actual operating environment at a minimal cost. In addition, it would be desirable to provide such a training system which can be easily modified in response to changes in the design or appearance of the system.

SUMMARY OF THE INVENTION

Pursuant to the present invention, a system is provided for simulating an operating environment where the operating environment has manipulable controls. The system includes a video signal storage device for storing and transmitting an image of the operating environment. Also, a video monitor is coupled to the video signal storage device for displaying an image of the operating environment. The system includes a graphics generator for generating an overlay image on the video monitor that can simulate the appearance of one of the manipulable controls in a plurality of its manipulative states. A host computer is coupled to the video signal storage device, the video monitor, and the graphics generator, for controlling the display of these images on the video monitor.

This invention results in a training system that eliminates the necessity of building a hardware mockup of the operating environment since all of the necessary views of the environment and controls and displays appear on one or more video monitors. Moreover, the use of an overlay image to simulate the appearance of the controls in a plurality of states means that separate images of the controls are not required for each possible set of states of the controls. Also, the appearance of the simulated environment can be easily changed by simply photographing a new image of the new operating environment, and by changing the appearance of the overlay image.

BRIEF DESCRIPTION OF THE DRAWINGS

The various advantages of the present invention will become apparent to one skilled in the art by reading the following specification and by reference to following drawings in which.

DESCRIPTION OF THE PREFERRED EMBODIMENTS

The term "glass trainer" as used herein means a training system as described herein which uses overlaid images on video monitors to simulate the appearance of the hardware controls in a plurality of control states for different hardware. The glass trainer of the invention thus avoids the cost, expense, and time associated with simulating a variety of different hardware in a variety of operating states.

Figure 1:
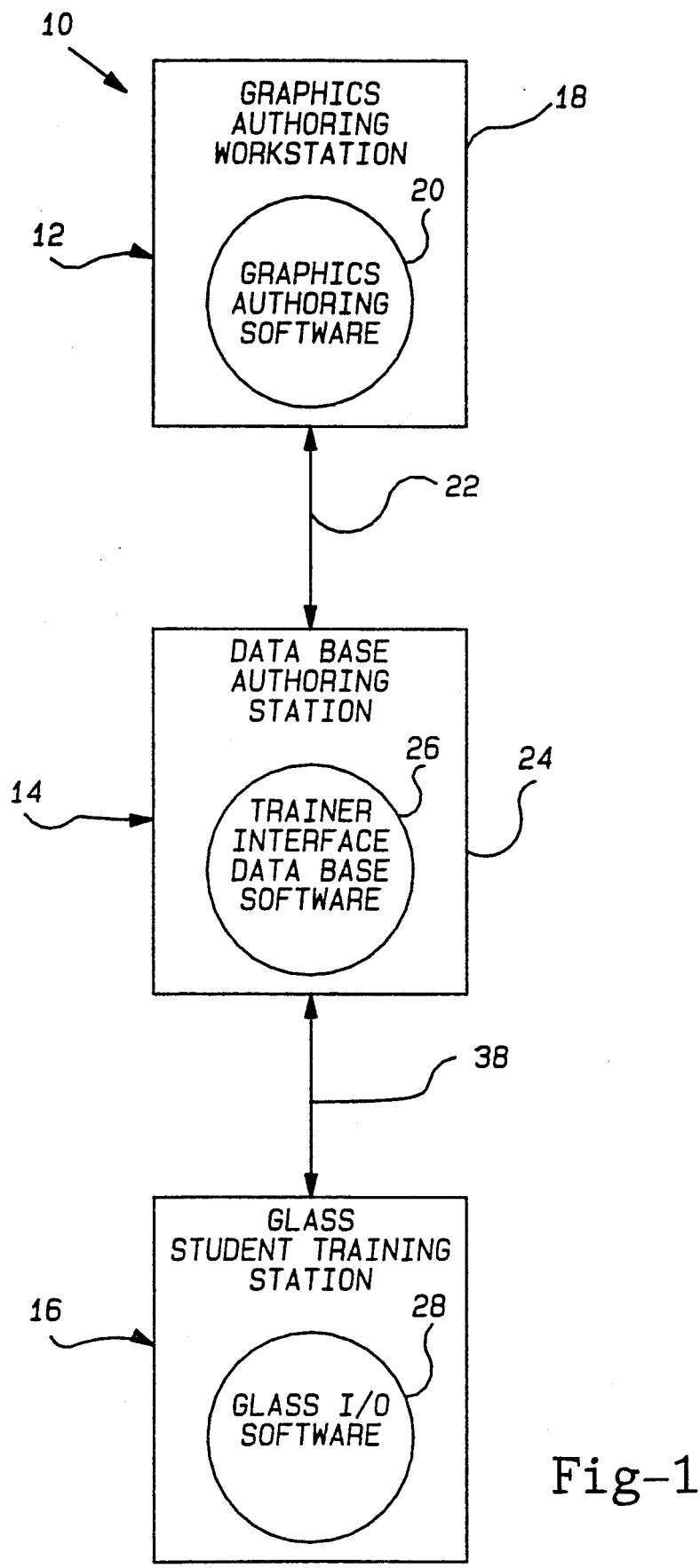
FIG. 1 is a block diagram of the glass trainer system in accordance with the present invention.

Referring now to FIG. 1, there is shown a block diagram of an interactive reconfigurable simulator and training system, hereinafter referred to as a "glass trainer" 10 in accordance with the present invention. The glass trainer 10 may be used in a number of applications including the training of operators for stationary environments such as process control systems, or for mobile systems such as ground and airborne vehicles.

The glass trainer 10 consists of a three main subsystems; a graphics authoring workstation 12, a database authoring workstation 14, and a glass student training station 16. The graphics authoring workstation 12 consists essentially of an IBM compatible personal computer 18 which contains the graphics authoring software. This is where courseware graphics authoring is performed. The database authoring workstation 14 consists of a VAX computer 24 (manufactured by Digital Equipment Corporation) which is connected to the graphics authoring workstation 12 by a DECNET link 22. The VAX computer 24 container The Trainer Interface Software 26. The database authoring workstation 14 contains the courseware database. This is where the courseware database and simulator database are authored and updated.

The glass student training station 16 consists of PC Bus and Multibus computers combined with graphics monitors and other peripheral equipment. The glass student training station 16 contains the glass I/O software 28 and is connected to the database authoring station 14 by means of and Ethernet link 30.

Figure 2:
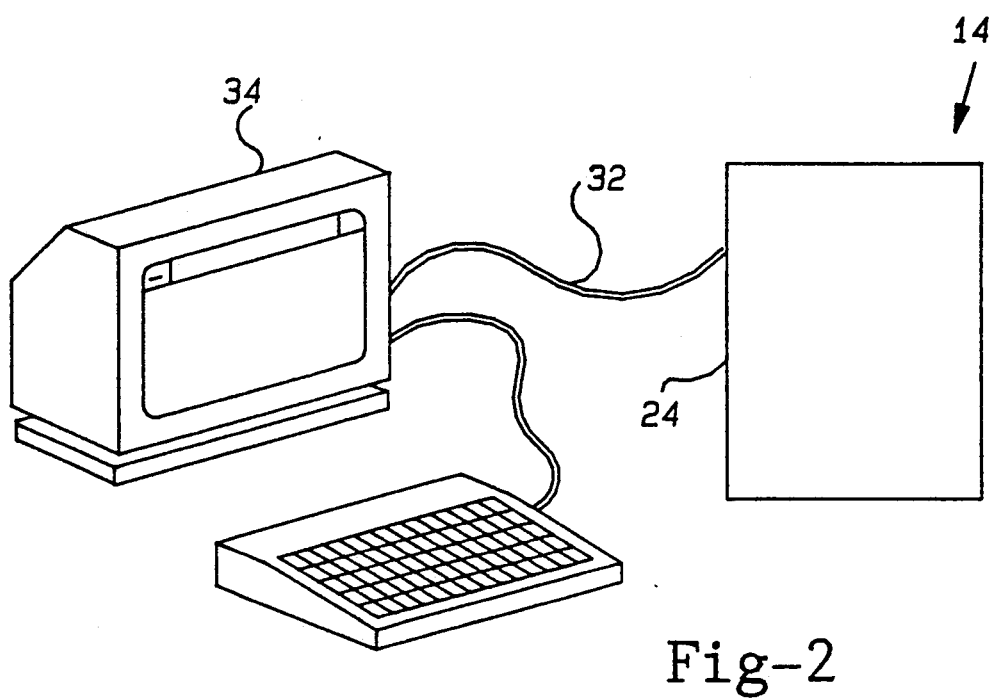
FIG. 2 is a diagram of the database authoring workstation shown in FIG. 1.

FIG. 2 shows the database authoring station 14 in more detail. The VAX computer 24 is connected by means of an RS 232 bus 32 to a computer terminal 34 which includes a keyboard with function keys.

Figure 3:
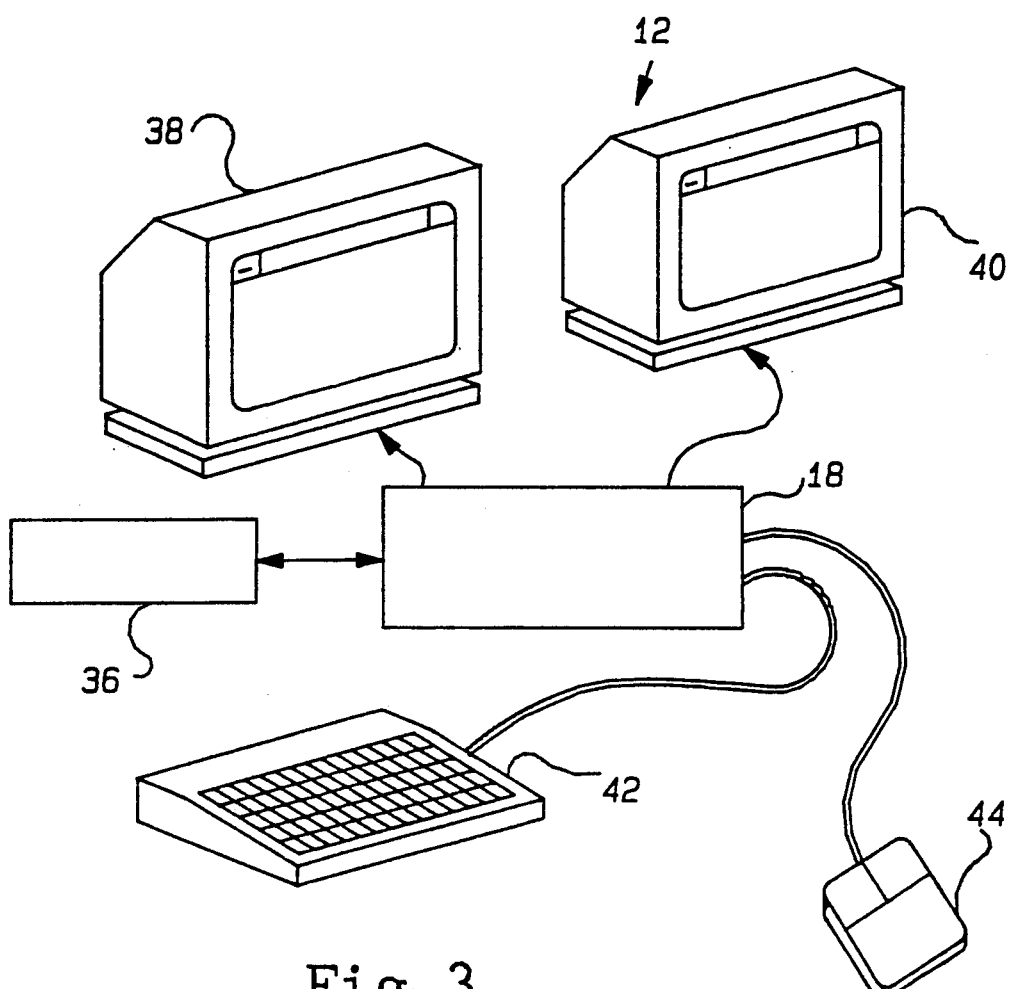
FIG. 3 is a diagram of the graphics authoring workstation shown in FIG. 1.

FIG. 3 shows the graphics authoring workstation 12 in more detail. The IBM compatible personal computer 18 is attached to a video disc player 36, a video overlay monitor 38, a high resolution graphics monitor 40, a keyboard 42 and a mouse 44.

Figure 4:
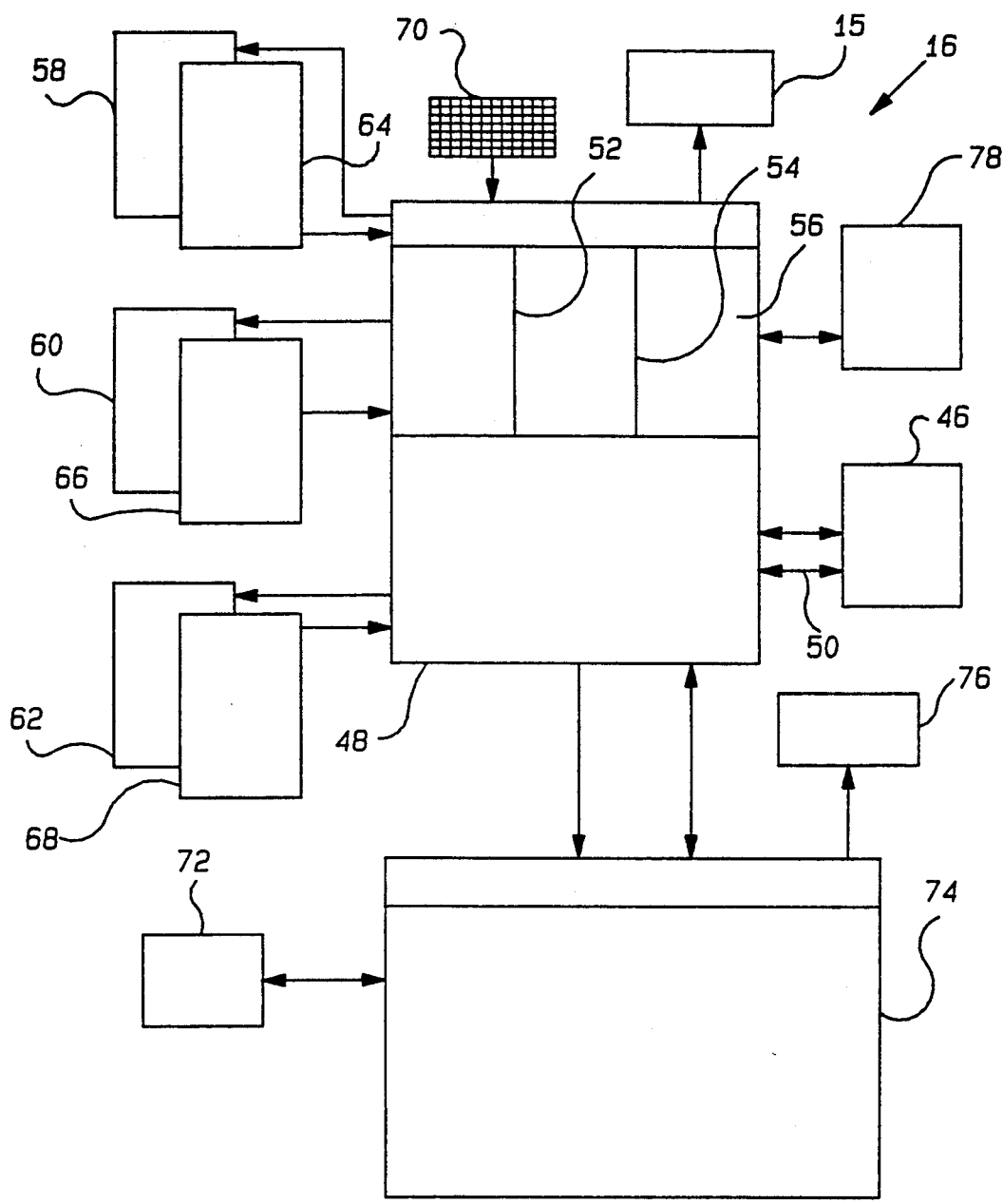
FIG. 4 is a block diagram of the glass student training station shown in FIG. 1.

FIG. 4 shows the glass student training station 16 in more detail.

A photograph pr photographs of the actual equipment to be simulated during training is stored in a video storage device 46 shown in FIG. 4. While actual photographs are preferable, it will be appreciated that artist renderings, or computer generated graphics can also be used and stored in the video storage device 46. The video storage device may comprise, for example, a video disc player. The video storage device 46 is connected to a PC bus card rack assembly 48 by means of video communication, and RS 232, buses 50.

The card rack assembly 48 is connected to a central computer 15 which may comprise, for example, an IBM PC AT personal computer. The card rack assembly 48 may contain a microcomputer with memory 52, high resolution graphics generators 54, and a graphics overlay card 56. In addition, other necessary controllers such as an IEEE controller, a disc controller, and touch screen controllers (not shown) are included in the card rack assembly 48. Video monitors 58, 60, 62 are connected to the card rack assembly 48 for displaying the image stored on the video storage device 46 and also for displaying a computer generated graphics overlay. In the preferred embodiment, the monitors 58 and 60 are high resolution monitors while monitor 62 is a medium resolution monitor, which is used where high resolution is not required. In addition, the monitors 58, 60, 62 are equipped with touch screens 64, 66, 68 for permitting the user to interface with the simulated manipulable controls generated and displayed on the monitors.

A keyboard 70 is also provided for supplementing the touch screens in allowing the user to communicate with the glass trainer 10. A command terminal 72 including a monitor and keyboard is connected to the card rack assembly 48 for displaying the instructional information and menus available and to assist authoring, editing and testing procedures used to develop instructional programs, or "courseware".

The command terminal 72 interfaces to the card rack assembly 48 by means of a Multibus card rack assembly 74. Multibus is a registered trademark of Intel Corporation, Santa Clara, Calif. The multibus card rack assembly 74 includes microcomputer with memory, an RS-232 port, an IEEE 488 controller and an audio delivery system controller for providing interface with the PC bus card rack assembly 48. In addition, an audio display system 76 is connected to the Multibus card rack assembly 74 for delivering audio output to the user. The command terminal 72 may also be used by the user during training to control various functions of the glass trainer 10. A removable media storage device 40 which may consist of a winchester drive may be used for program storage.

When a student is using the glass student training station 16, actual photographs of the equipment to be simulated are captured in the video storage device 46 and are displayed on monitors 58, 60 and 62. Different states of manipulable devices on the actual equipment are represented by overlay graphics on the video images. The user manipulates these simulated images by touching one of the touch screens 64, 66, 68 at the places where these images are located. The appearance and location of the graphics overlay on the monitor, 58, 60, 62 are specified by the courseware database which is authored by means of the graphics authoring workstation 12.

I. AIRCRAFT TRAINING SYSTEM

Figure 5:
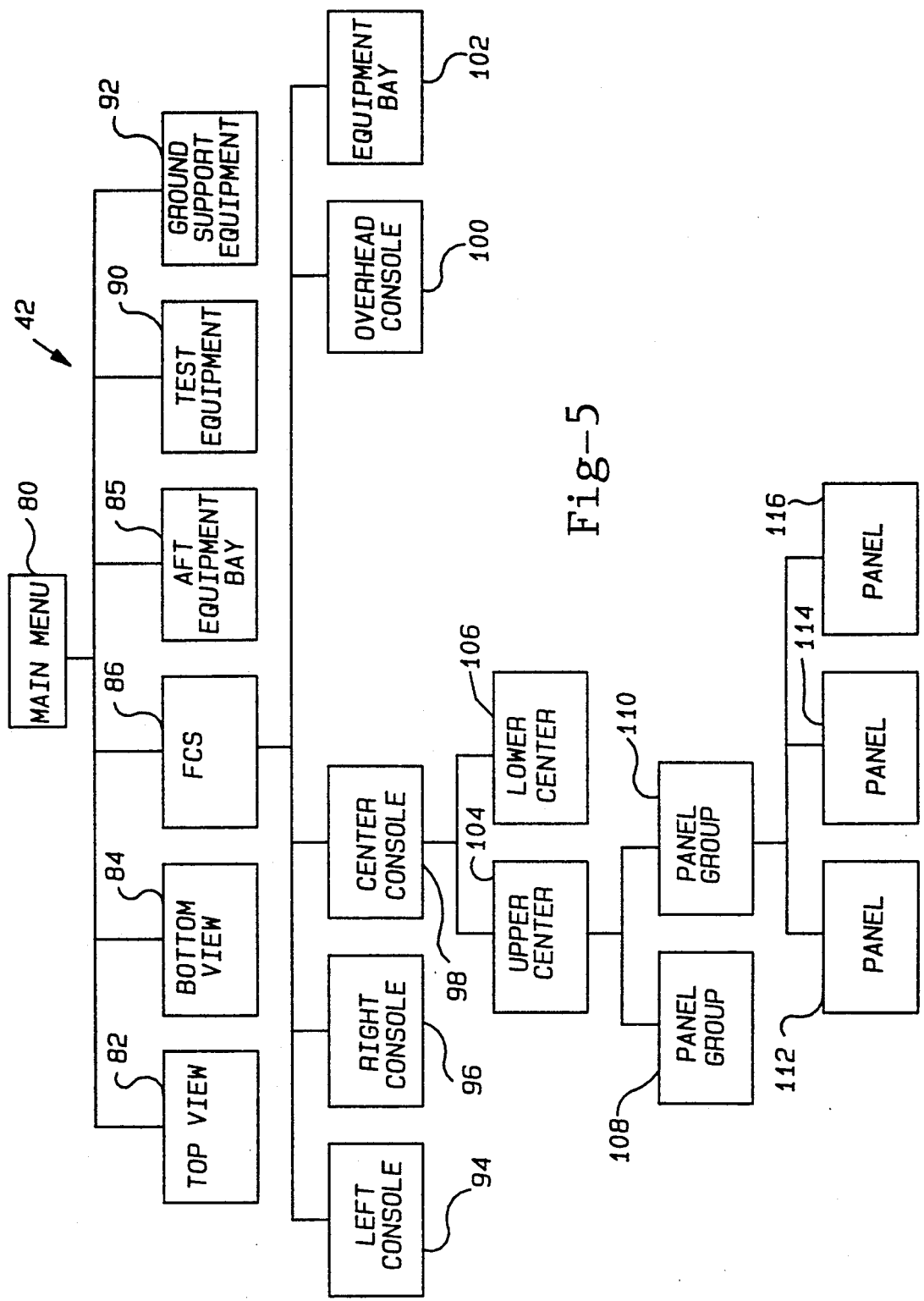
FIG. 5 is a diagram of the video hierarchy of individual frames in one embodiment of the present invention adapted to be utilized in an aircraft training system.

In accordance with a preferred embodiment of the present invention, the glass trainer 10 may be adapted to provide training and simulation for operators of an aircraft. Referring now to FIG. 5, a video hierarchy 78 of simulated locations in an aircraft cockpit are shown. Each of the frames depicted in the video hierarchy 78 represent a single video frame; that is, a single photograph of a portion of the cockpit. Initially, the user of the graphics authoring workstation 12 is presented with a main menu screen 80 which permits the selection of one of six primary video sequences. These include a top view 82, bottom view 84, Flight Crew Station (FCS) 86, aft equipment bay 88, test equipment 90, and ground support equipment 92.

For example, if the user selects the FCS video sequence 86, he may select between one of the five scenes in the cockpit including left console 94, right console 96, center console 98, overhead console 100 and equipment bay 102. While the user is viewing the center console 98, he may select a closer view of a portion of this console by selecting the upper center 104 or lower center 106 screen. While viewing the upper center 104, the user may focus on one or more panel groups 108 and 110. While viewing the panel group 110, the user may then select one of the three individual panels 112, 114, 116 in that panel group 110. The above described hierarchy thus facilitates access to any particular location by proceeding through a sequence of broader to narrower views of the cockpit.

A. Graphics Overlays

Figure 6A:
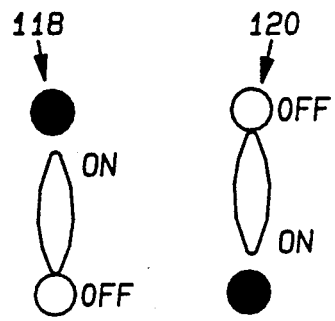
FIGS. 6a-6l are examples of graphics overlays simulating various kinds of controls and displays in multiple positions.
Figure 6B:
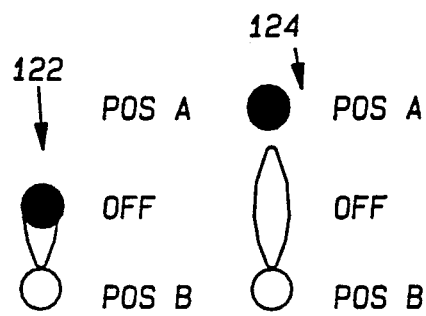
Figure 6C:
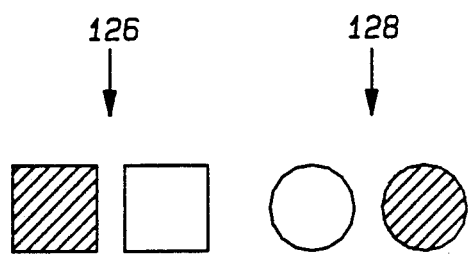
Figure 6D:
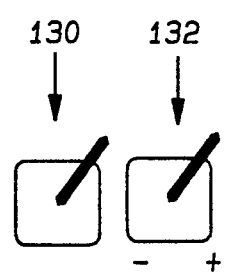
Figure 6E:
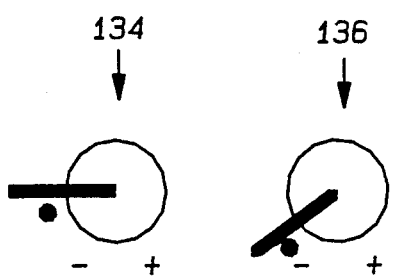
Figure 6F:
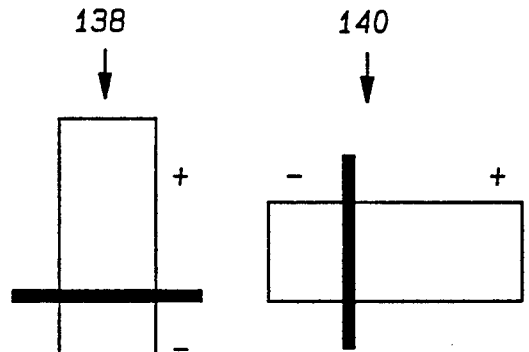
Figures 6G, 6H:
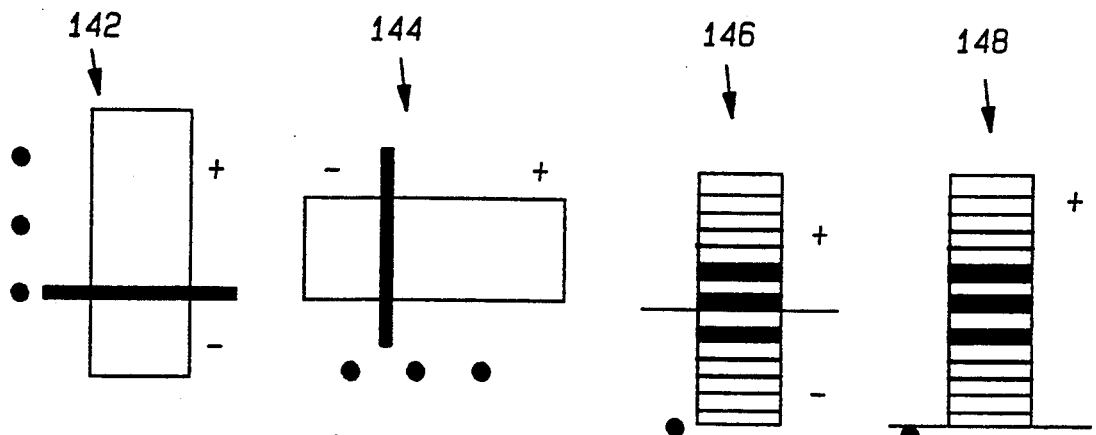
Figures 6I, 6J:
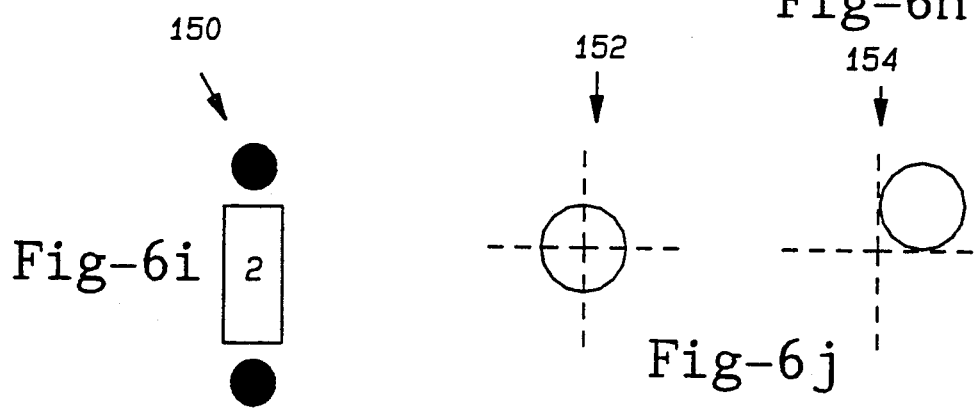
Figures 6K, 6L:
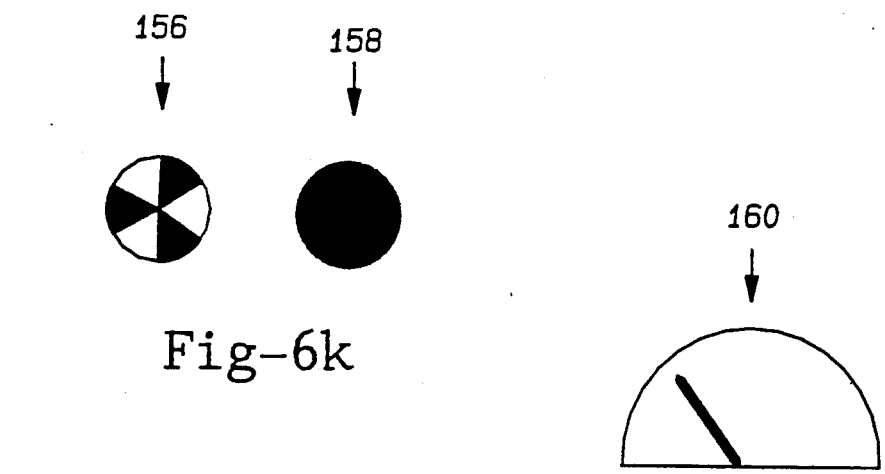

FIGS. 6a-l show examples of graphic overlays which are presented to the user on the monitors 58, 60, 62 in the appropriate location in the video screens shown in FIG. 4. These graphics overlays will be programmed in software stored on the removable media storage device 78. They are generated and overlayed by means of the graphics generator 54 and graphics overlay card 56 in the glass student training system 16 shown in FIG. 4. The graphics overlays are manipulable by touching the touch screen 64, 66, 68 at the appropriate location in front of the graphics overlay. FIG. 6a–6k show examples of input devices which may be simulated and FIG. 6l shows an example of an output device. It will be appreciated that other kinds of devices may be simulated such as maintenance action devices for training in maintenance procedures and for other special device types.

In more detail, FIG. 6a illustrates a latched toggle switch in the "on" position. The solid circle depicts the current position of the toggle switch. The user changes the position of the toggle switch by touching the position that is desired. For example, by touching the touch screen adjacent to the "off" symbol, the circle appears adjacent to the word "off" as shown in the toggle switch image 120. FIG. 6b illustrates a spring loaded toggle switch in the off position 122 as denoted by the solid circle adjacent to the word "off". If it is desired to place the switch into position A, the touch screen is touched to the left of the words "POS A" and the graphics image will change the one illustrated at 124 as long as that position is touched. When released, the device returns to the spring loaded position. FIG. 6c illustrates a set of latched push buttons 126, 128. Latched push buttons, for example, may be used in an aircraft cockpit to represent blade seal protectors, safety pins, wheel chalks, warning flags, powering up the external electrical cart, etc. The push button can be circular as shown at 128 or rectangular as shown at 126. The out or protruding position is represented by the outlined circle or square, and the "in" state is represented by the solid circle or rectangle. Alternatively, the push buttons in FIG. 6c may represent spring loaded push buttons which will represent the "in" state when touched but which will return to the out state when the touch is removed from the screen.

FIG. 6d indicates a symbol used to represent rotary switches with discrete positions 130. The pointer indicates the current position of the rotary switch. To select this device, the user touches near its centerpoint and small "+" and "−" signs appear as shown with symbol 132. Touching the rotary touch target a second time will deselect the rotary, and the + and − corresponding touch targets are removed. Touching the − sign will move the pointer counterclockwise. It will continue to move jumping from one discrete position to the next, until released or until it reaches the left most position. Touching + works the same as touching − except that the pointer moves clockwise.

FIG. 6e shows symbols used to represent a circular analog device with a stop. Like the circular analog switches 130, 132 shown in FIG. 6d, touching the circular analog with stop 134 near its centerpoint will cause the − and + signs to appear. Touching a second time will deselect the switch causing the + and − signs to be removed. Touching − will move the pointer counterclockwise continuously until released, or until it reaches the left most position represented by the dot. When the analog reaches the left most position, it pauses before jumping to the dot position indicating the switch is off as shown by symbol 136. Touching + works the same as touching − except the pointer moves clockwise. When the switch is off touching + causes the pointer to jump to the position indicating the switch is turned on and after a pause moves the pointer clockwise.

FIG. 6f indicates a slide type linear analog switch. The line indicates the current position of the slide. The slide may move vertically as in 138 or horizontally as in symbol 140. Touching the slide near the center will select or deselect the slide causing the + and − symbols to appear or be removed. Touching − will move the line down, or to the left, in a continuous motion until it reaches the extreme position and touching the + moves the line in the opposite direction. Similarly, FIG. 6g shows symbols for linear analog switches with detent. Which may be used for example to represent throttles. The line indicates the current position of the analog and the switch is selected by touching near its centerpoint causing the + and − signs to appear. Deselection is accomplished by a second touch near the center of the switch. Touching − will move the line down on switch 142, or to the left in switch 144, in a continuous motion. The line will pause when it reaches a detent position before continuing to move. Likewise, touching + moves the line in the opposite direction.

FIG. 6h illustrates a linear analog with stop symbol 146. The device may be used to represent continuous turn (no detents) thumb wheels that have a discrete position (like an on/off switch) associated with them. The switch is turned off by moving the analog all the way down. This device is similar to a circular analog with stop. The line indicates the current position of the analog. A small dot indicates the off position of the latched push button associated with this device. The device is selected by touching near at center point causing small + and −signs to appear. Touching − will move the line until the line reaches the bottom position, where it will pause before jumping to the dot position indicating the switch is off, as shown in symbol 148. Touching + moves the line up. When the switch is off touching the + causes the line to jump to the position indicating the switch is turned on and, after a pause, continues to move up.

FIG. 6i indicates the symbol 150 used to illustrate digilevers or thumbwheels with labeled detented positions. The current position of the digilever is displayed using graphic overlay. To change the position, the solid circle touch target above the digilever is touched to increase its value or the solid circle touch target below the digilever is touched to decrease the value.

FIG. 6j shows a symbol for a joystick. Joystick x positions and y positions are a represented by a solid circle. When the screen is not touched the joystick appears in the center as shown in 152. To move this device, the position in which it is desired to move the joystick is touched. Thus, for example, by touching the upper right quadrant as shown in 154, the joystick is moved in that direction. The joystick remains in this position as long as the screen is touched when released, the circle returns to the center position as shown in 152.

FIG. 6k indicates a fault indicator represented by the black and white faulted state symbol 156. The reset state is represented by the solid circle 158. When the fault indicator 156 is touched, it will be reset unless the fault is still present in the system in which case the fault indicator will not reset.

Numerous output devices may be utilized including for example, lamps, alphanumeric displays etc. FIG. 6l indicates an analog meter 160 in which the current position is represented with a graphic overlay line.

B. Courseware Database

Figure 7:
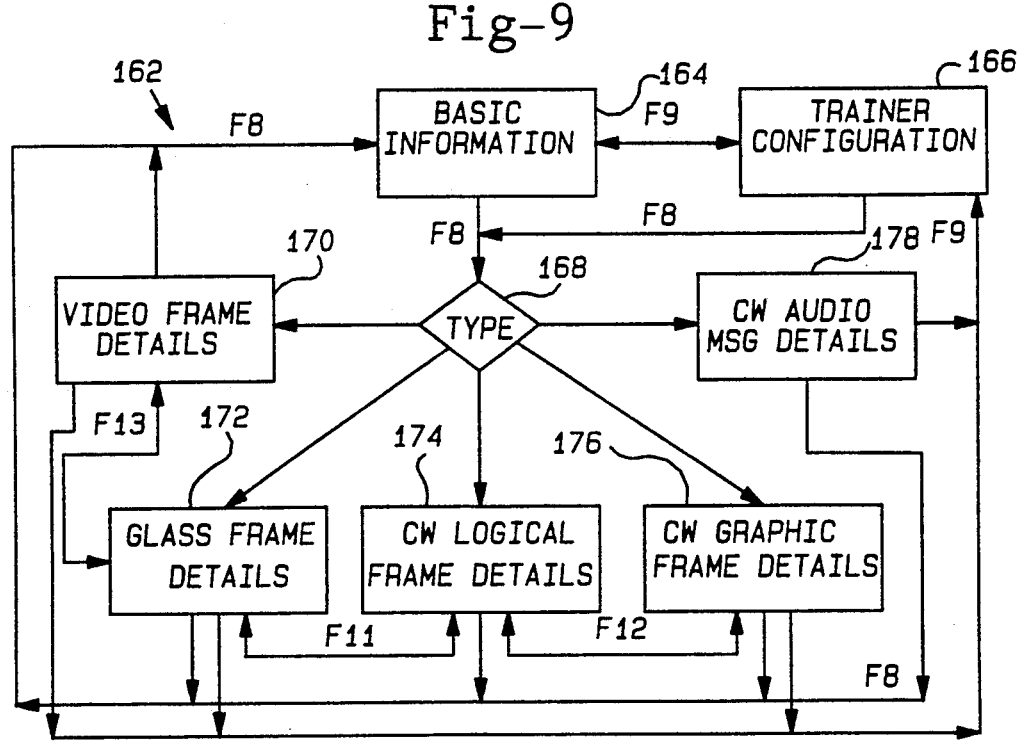
FIG. 7 is a diagram of the hierarchy of the screens used to update the courseware database in the trainer interface database.

The appearance and location of the graphics overlay on the video disc pictures is specified by a database. This database is authored using the database authoring station 14 shown in FIG. 2. FIG. 7 is an overview of the trainer interface database courseware hierarchy. The courseware part of the database consists of the following six items:

1. Base information. This is the basic definition of an item, for example, the name of the device, and the type of device it is.
2. Video frames. This is the definition of each video, simulation image.
3. Glass frames. This is the definition of the overlay frames which describe the displays and buttons which can overlay video frames which are part of the video hierarchy.
4. Courseware graphics. This is the definition of the overlay frames which describe the instructional graphics to be presented.
5. Logical frames. These are the definitions of the relationships between the previous three kinds of frames the trainer software will use to produce the instructional message to be presented to the user or student.
6. Audio frames. These are the definitions of the instructional audio messages to be presented to the student.

C. Courseware Database Update

The courseware parts of the trainer interface database may be updated during a courseware database update. During the courseware update, the hierarchy 162 of the screens and the function keys which transition between the screens is shown in FIG. 7. For example, when the courseware database update function is first executed, the user will be presented with the basic information screen 164 as illustrated in FIG. 7. Initially, the user will then select between various available types of courseware data elements. Users will make selections during the courseware database update by utilizing a user interface screen management capability which may comprise for example a glass device type user interface. Once a component type has been selected, the user will then be presented with a list of all existing items of that particular type. The user may then select one of the existing elements or a new one. The component name will appear or the user may select a new name. The user may then select from a list of help phrases which have the purpose of narrowing the list of choices from which a selection can be made.

Next, the user in the basic information processing screen 164 will select the data type which may be, for example, discrete, analog or none. If the F9 key is pressed when the basic information screen is displayed, the trainer configuration screen 166 will be displayed. The user then selects the proper category for the named component from a list presented in the trainer configuration screen 166. Examples of these configurations include armament, avionics, electrical and lighting, environmental control system, flight control system, fuel, hydraulics and propulsion. Within each of these categories further configuration selections may be made for example, Computer Assisted Procedures Trainer (CAPT), Computerized Maintenance Trainer (CMT), Desk Top Trainer (DTT), etc. If the F9 key is pressed when the trainer configuration screen 166 is displayed, the basic information screen 164 will return.

If function key F8 is pressed when either the basic information screen 164 or the trainer configuration screen 166 is displayed, the detailed information screen which matches the component type of the item being processed will appear. The selection is made by the decision diamond logic step labeled "type" 168. There are five types of detailed information screens: video frame details 170, glass frame details 172, courseware logical frame details 174, courseware graphic frame details 176 and courseware audio message details 178.

When the user presses F8 and a video component type has been selected in the basic information screen 164, the video frame details screen 170 will be selected. The name of the component will appear and the user will select a valid media type such as tape or disc corresponding to the type of medium selected for the video storage device 46 shown in FIG. 4. The user can return to the basic information screen 164 by pressing a F8 and can return to the trainer configuration screen 166 by pressing F9.

If a glass frame using this particular video frame is called out on the basic information screen 164 and function key F13 is pressed when the video screen 170 is displayed, the glass frame details screen 172 will be displayed. Otherwise, F13 will cause an invalid key message. Alternatively, when the selected component type is a glass frame, and F8 is pressed when the basic information screen 164 appears the glass frame details screen 172 will be presented. Information about the glass frame will then be displayed. The user may then select valid frame types such as high resolution instructional display unit (monitor 24, 26) or video. The user will then be presented with a list of valid selections of frame names and may select an existing frame. If a courseware frame using this glass frame is called out on the basic information screen and function key F11 is pressed when the glass frame details screen 172 is displayed, the courseware logical frame details screen 176 will be displayed. If F13 is pressed when the glass frame detail screen 172 is displayed, the video frame details screen 170 appears for the current video frame. The user may return to the basic information screen 164 or the trainer configuration screen 166 from any of the detailed information screens 170-178 by pressing F8 or F9 respectively.

When in the basic information screen 164 is displayed for a courseware graphic frame, and F8 is pressed, the courseware graphic frame details screen 176 will be displayed. The user may then select a type of instructional display unit such as the high resolution or video (medium resolution) instructional monitors 58, 60, 62. If a courseware frame using this courseware graphic frame is called out on the basic information screen 164, and the function key F12 is pressed when the courseware graphic frame details screen 176 is displayed, the courseware logical frame details 174 will be displayed.

When a courseware logical frame is called out on the basic information screen 164, and F8 is pressed by the user, the courseware logical frame details screen 174 will be displayed. The user will be allowed to select an existing glass frame as well as graphic frames. If function F11 is pressed when the courseware logical frame details screen 174 is displayed, the glass frame details screen 172 will be displayed for the glass frame shown or selected. If the function key F12 is pressed when the courseware logical frame detail screen 174 is displayed, the graphic frame details screen 176 for the graphic shown on the current screen will be displayed.

When the user presses F8 for an audio frame displayed in the basic information screen 164, the courseware audio message details screen 178 will be displayed. If an audio frame exists with the selected name, its information will be displayed. The user will then be allowed to type in a text message which for example, may serve to aid authors in remembering the content of the audio message, which is processed separately.

D. Simulation Database Update

The non-courseware parts of the trainer interface database are updated by means of a simulation database update function using the database authoring station 14 in FIG. 2. The simulation part of the database consists of the following five items:

1. Base information. This is the basic definition of an item.
2. Student interfaces. These are the definitions of hardware and glass interfaces available to the student.
3. Environmental parameters. These are the definitions of the control interfaces used by courseware to regulate the non aircraft components of the simulated state.
4. Wait on Simulation (WSIM) parameters. These are the definitions of the functional monitoring interfaces used to provide simulation feedback to the procedures.
5. Simulation text messages. These are the definitions of the messages to be presented when the student action requires feedback of a simulated condition not available via an aircraft indicator.

Figure 8:
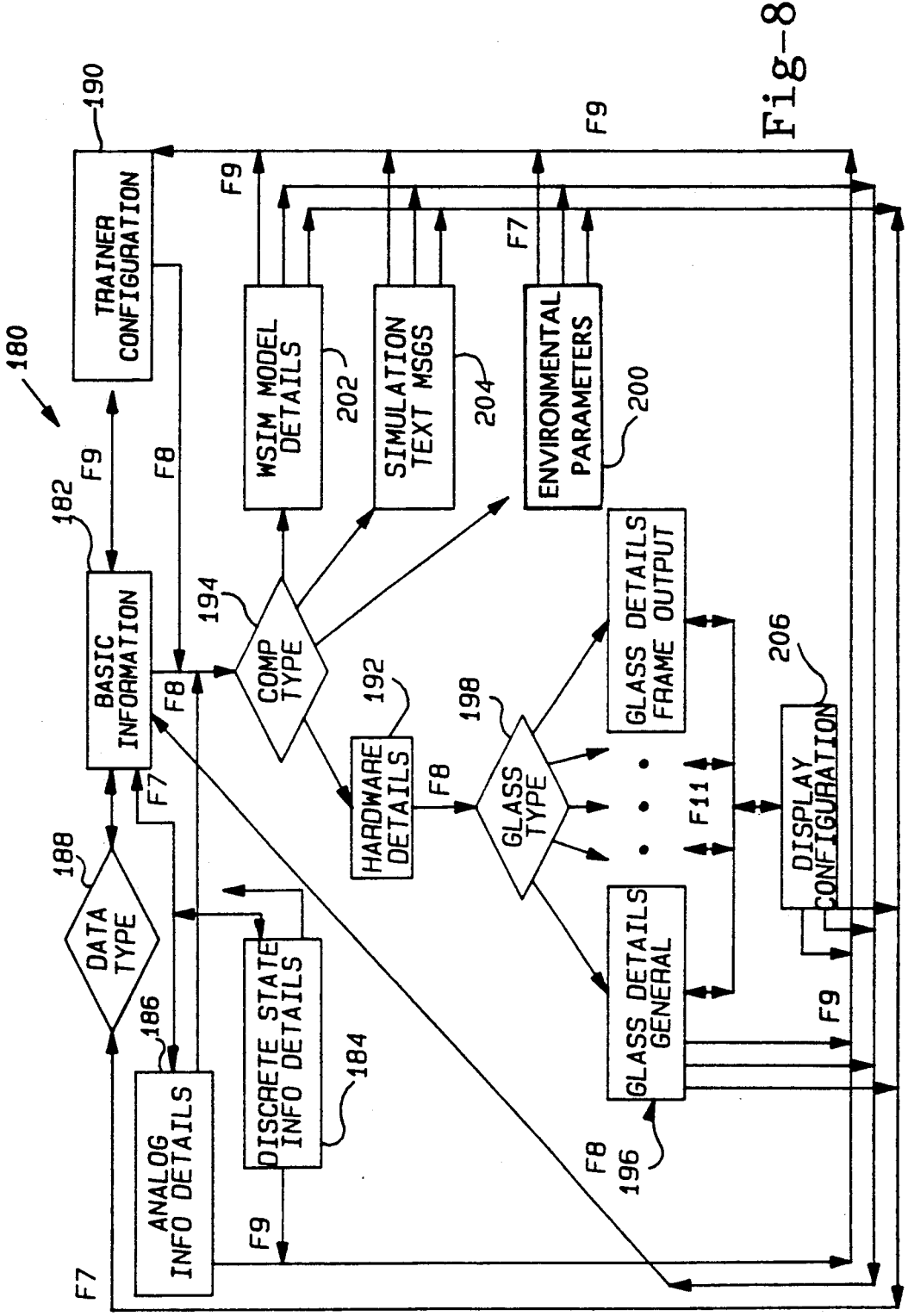
FIG. 8 is a diagram of the hierarchy of screens used in the trainer interface database.

The hierarchy 180 of the screens which collect this information and the function keys which transmit between them for the simulation database are shown in FIG. 8. The simulation database update supports the generation and modification of the trainer interface database. Menus and prompts are used to guide the user through the update process, which produces a trainer interface database.

When first executed, the simulation database update function shall present the user with the basic information screen 182. The available types of simulation data elements will be listed. When a component type has been selected, the screen will list all existing data elements of the selected type. The user will then be allowed to select an existing element, or type in a new one. The user will next be allowed to select from various help phrases among valid selections that are listed. Next, the user will select among a list of data types i.e., discrete analog, string, and none.

If the function key F7 is pressed when the basic information details screen 182 is displayed, the discrete state information details screen 184 will be displayed if the data type is discrete and the analog information screen 186 will be displayed if the data type is analog as determined by the data type decision diamond 188. If F9 is pressed when the basic information screen 182 is displayed, the trainer configuration screen 190 will be displayed.

When the discrete information detailed screen 184 is called up by the data type decision diamond 188, the currently defined state values and associated names will be displayed. The user may select an existing state to modify or may type in a new state. If the function key F9 is pressed when the discrete state information details screen 184 is displayed, the trainer configuration screen 190 will appear.

When the analog state information details screen 186 is called up, the user will be allowed to select low value and high value numbers as well as a current number which must be between the high and low values. The user may also be allowed to select a step size number. The trainer configuration screen will be called up when the F8 is pressed. Similar selections for trainer configuration as described above in connection with the trainer configuration screen 166 in FIG. 7 are also available in the trainer configuration screen 190 in FIG. 5.

If the function key F8 is pressed when the basic information screen, the discrete state information screen, the analog state information screen 186 or the trainer configuration screen 190 is displayed, the detailed information screen which matches the correct component type of the item is displayed. That is, the hardware details screen 192 will be selected by the component type decision diamond 194 when the component type is a hardware student interface. One of the glass interface details screen 196, will be presented when the component type is a glass student interface as decided by the glass type decision diamond 198. The environmental parameter details screen 200 will be selected when the component is an environmental parameter. The wait on Simulation—(WSIM) model details screen 202 will be selected when the component is a WSIM parameter. The simulation text message details screen 204 will be selected when the component is a simulation text message.

In more detail, when the user presses the F7 key for a hardware item, the hardware detail screen 192 will be displayed. If an existing hardware element is being modified the current information on that element will be displayed, otherwise all fields shall be blank. The user will be allowed to select a trainer type, a hardware type, a board, a rack number, a field width, a node (which is a hardware cardrack containing one or more computers), an input address, an input start bit, or an input port.

If the function key F8 is pressed when the hardware detail screen 192 is displayed, the glass detail information screen 196 which matches the component type of the item will be displayed as decided by the glass type decision diamond 198. These glass types shall be the overlay frame which describe the displays and buttons comprising the overlay. For example, those displays listed in FIGS. 6a-6d. If the function key F11 is pressed when any of the glass details screens 196 are displayed, the display configuration screen 206 will be displayed. The display configuration screen 206 operates in a similar fashion to the trainer configuration screen and permits the user to select among display configuration alternatives which may include various monitors such as student station monitor, high resolution monitor, video overlay monitor, etc. The glass details screens 196 are categorized according to a number of categories which include general, circular analog-rotary, digilever numeric joystick shafts, linear analog, etc.

When the basic information screen 182 is displayed and the user presses the F8 button, and the component is an environmental parameter, the environmental parameter details screen 200 will be displayed. The user will be able to make such selections as whether the item is available to courseware or not, available to instructional features, available to simulation, available at initialization only, etc. If the F8 function key is pressed while the basic information screen 182 is displayed, and the item is a simulation text message, the simulation text message detail screen 204 will be displayed. The existing simulation text message may be modified or a new message may be entered. When the item is a WSIM model element and the F8 key is pressed while the basic information screen is displayed, the WSIM model details screen 202 will be displayed. The user may then modify the WSIM model element.

E. Courseware Graphics Authoring

Figure 9:
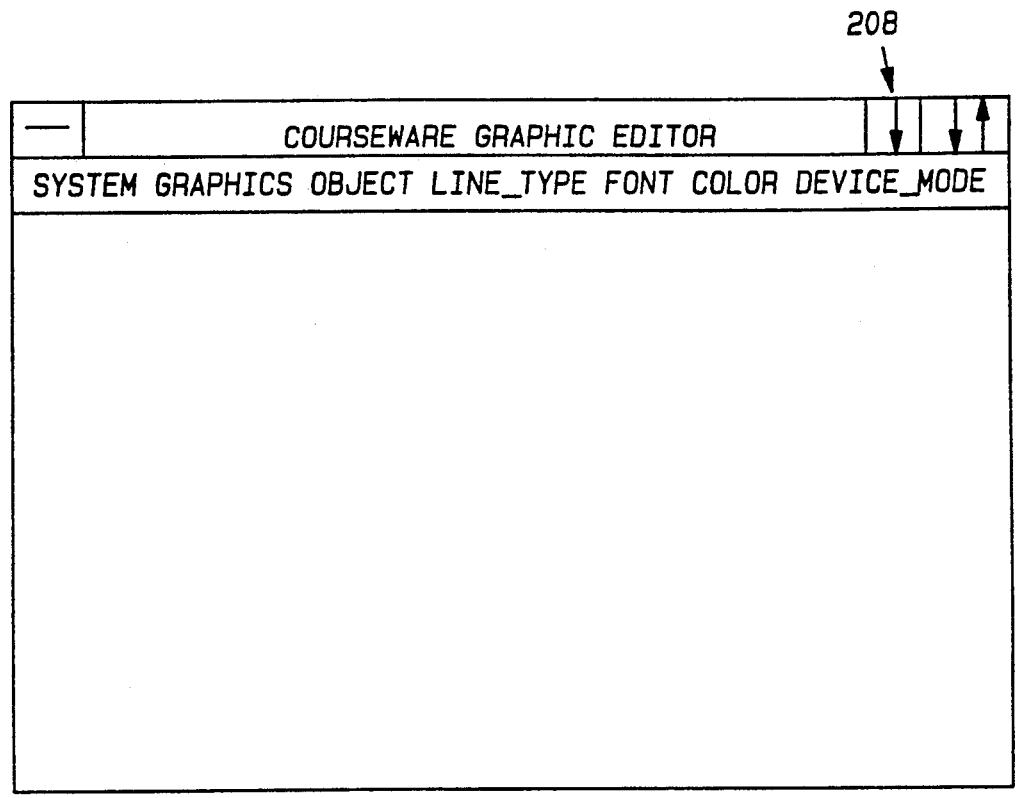
FIG. 9 is a example of a screen for a graphics editor main menu used to permit courseware graphics authoring in accordance with the present invention.

Courseware graphics authoring is performed at the graphics authoring workstation 12 shown in FIG. 3. The courseware graphics authoring function provides for the creation and modification of graphic presentations suitable for overlay on video frames. This provides for the creation and modification of high resolution graphics symbols. FIG. 9 illustrates the main menu for the courseware graphics editor which contains a number of menu 208 items that are selectable via mouse input. Selecting a menu allows the user to select a command from that menu, for example by selecting the "System" menu the user is able to select one of the systems commands for the courseware graphics editor. The system menu will permit the user to put the system into six different modes including video overlay device authoring mode, video overlay static graphics mode, video overlay courseware graphics mode, high resolution device authoring mode, high resolution static graphics mode, and high resolution courseware graphics mode.

In the graphics mode the user is presented with a menu of graphics actions which may be performed. For example this list may include the following actions: add, which will allow the user to add graphic objects to the frame; move, which allows the user to move graphic objects; delete, which allows the user to delete graphic objects from the frame; edit, which allows editing the shape of graphic objects; copy, which allows the user to make a copy of a graphic object; push, which allows the user to put a graphic object behind all other objects in the frame; pop, which allows the user to pop an object from behind other objects to the front; and group, which allows grouping of graphic objects, etc.

When in the object mode, the object menu of the courseware graphics editor presents the user with types of objects which may be manipulated. These include for example, line, which defines the graphic object to be added as a line when the function is in the graphic add mode. Likewise, the user may select from other graphic objects to add such as circle, rectangle, text, polygon, and arc. Also, while in the graphics mode the user may select from the line type menu a number of line types including solid, which will set the current line type to solid, start arrow, end arrow, double arrow, vertical/horizontal, etc. When in the graphics add mode the font menu will permit the selection of font size such as large, medium or small.

The color menu permits the user to select among a list of colors to be the current color for adding graphic objects. These colors may include for example, red, yellow, green, white, brown, orange, etc. The device mode menu for the courseware graphics editor will be enabled when in either the video overlay device authoring mode or the high resolution device authoring mode. These may include selections to permit the addition or deletion of devices to display the allocated touch sensitive areas, display a reference grid, play the video associated with the present display, or display specific courseware devices.

In addition, the courseware graphics authoring function includes two sub functions: the graphics editor and the device editor. The graphics editor provides an environment and a capability to create and modify courseware graphics symbols. It is active in the video overlay static graphics, video overlay courseware graphics, high resolution static graphics and high resolution courseware graphics modes. Courseware graphics symbols are created from graphic objects or by combining previously developed graphic symbols. In addition, this sub-function will provide the capability for entering and modifying text as paragraphs. And will allow the user to select between two different modes for the creation of lines, vertical/horizontal mode and diagonal mode. In addition, the graphics editor will support the copy, delete, push, pop and move editing commands executed from the graphics mode menu. The device editor provides the capability to allocate glass devices for display on the trainer high resolution monitor and video monitor. It is active only in the video overlay device authoring mode and the high resolution device authoring mode. It has the capability of adding, modifying and deleting glass devices. When a glass device is created the touch sensitive area for the glass device is also allocated.

The present invention provides a glass trainer 10 in which the appearance and location of graphics overlayed on video pictures are specified by a database which is authored using an interactive tool and employing a graphical user interface. The graphics overlays are used to represent different device states. The appearance of the overlays are specified by means of an easily modifiable database.

The glass trainer 10 thus provides a system for training in simulation which is thus expensive in building actual hardward mock-ups. In addition, this system is easily modified in response to changes in the design and appearance of the system without necessitating hardware changes by simply changing the video pictures and the graphics overlay.

Those skilled in the art can appreciate that other advantages can be obtained from the use of this invention and that modification can be made without departing from the true spirit of the invention after studying the specification, drawings and following claims.

We claim:

1. A vehicle simulation system for training operators of a hardware system comprising:

video storage means for storing and transmitting a plurality of static images, each consisting of a different view of the hardware system;

graphic generator means for generating overlay images simulating the appearance of manipulable controls in the hardware system in a plurality of states;

overlay processor coupled to the video storage means and to the graphics generator for combining the overlay images with the static images, the overlay images of a given manipulable control being superimposed over a corresponding manipulable control in the static image;

video monitor coupled to the video storage means, graphics generator means and overlay processor means for displaying said static and overlay images;

user interface coupled to said graphics generator means and responsive to user input for adjusting the state of said overlay images of manipulable controls; and host computer coupled to the video storage means, graphics generator means and overlay processor for controlling the sequence and state of the display of the static and overlay images to simulate a plurality of views of the hardware system with the manipulable controls in a plurality of states.

2. The system of claim 1 wherein said graphics generator means comprises a database for storing a set of commands specifying the appearance of said overlay image and means for storing said database.

3. The system of claim 1 further comprising means for developing said database including an interactive tool for providing a graphical user interface during development of said data base.

4. The system of claim 1 wherein said images of said hardware system comprise photographs of said hardware system.

5. The system of claim 1 wherein said video storage means comprises a laser disk player.

6. The system of claim 1 wherein said video monitor includes
a touch sensitive screen for transmitting a signal responsive to touching particular areas of said screen to said user interface means.

7. The system of claim 1 wherein said hardware system is the interior of a vehicle and said manipulable controls are the controls for operating said vehicle.

8. A vehicle simulation system for training operators of a hardware system comprising:
video storage means for storing and transmitting a plurality of static images, each consisting of a different view of the hardware system;
graphic generator means for generating overlay images simulating the appearance of manipulable controls in the hardware systems in a plurality of states;
overlay processor coupled to the video storage means and to the graphics generator for combining the overlay images with the static images, the overlay images of a given manipulable control being superimposed over a corresponding manipulable control in the static image;
video monitor coupled to the video storage means, graphics generator means and overlay processor means for displaying said static and overlay images;
user interface means coupled to said graphic generator means and responsive to user input for adjusting the state of said overlay images of manipulable controls;
host computer coupled to the video storage means, graphics generator means and overlay processor for controlling the sequence and state of the display of the static and overlay images to simulate a plurality of views of the hardware system with the manipulable controls in a plurality of states;
graphics authoring workstation coupled to said graphics generator means for authoring and updating said overlay images; and
a database authoring workstations for authoring and updating software, said software for defining a training program consisting of a sequence of said static images of said hardware system and said overlay images.

9. The system of claim 8 wherein said database authoring work station comprises a VAX computer and computer terminal connected to said graphics authoring work station and to said host computer.

10. The system of claim 8 wherein said graphics authoring work station comprises a personal computer, a high resolution graphics monitor, a video overlay monitor, a video disc player, a keyboard and a mouse.

11. The system of claim 8 wherein said graphics generator means comprises a database for storing a set of commands specifying the appearance of said overlay image, and a means for storing said database.

12. The system of claim 8 further comprising a means for developing said database including an interactive tool for providing a graphical user interface during development of said database.

13. The system of claim 8 wherein said images of said hardware system comprise photographs of said hardware system.

14. The system of claim 8 wherein said video storage means comprises a laser disc player.

15. The system of claim 8 wherein said video monitor includes
a touch sensitive screen for transmitting a signal responsive to touching particular areas of said screen to said user interface means.

16. The system of claim 8 wherein said hardware system is the cockpit of an aircraft and said manipulable controls are the controls for operating said aircraft.

17. A reconfigurable system for training operators for a variety of different hardware items in an operating environment, each hardware item having manipulable controls and displays which operate in a plurality of states, said system comprising:
an operator training station comprising video signal storage means for storing and transmitting a plurality of static images of said hardware in the operating environment, each consisting of a different view of the hardware system, video monitor means coupled to said video storage means for displaying said image of said hardware in the operating environment, graphics generator means for generating overlay images simulating the appearance of manipulable controls in a plurality of manipulative states, overlay processor coupled to the video storage means and to the graphics generator for combining the overlay images with the static images, the overlay images of a given manipulable control being superimposed over a corresponding control in the static image;
and a host computer coupled to said video signal storage means, said video monitor, and said graphics generator means for controlling the display of said images on said video monitor;
the system further comprising:
a graphics authoring work station coupled to said operator training station for authoring and updating said overlay image; and
a database authoring work station coupled to said operator training station for authoring and updating software, said software for defining a plurality of training programs, each program consisting of a sequence of said static images of said hardware in an operating environment and said overlay images of said plurality of manipulative states.

18. The system of claim 17 wherein said graphics generator means comprises a database for storing a set of commands to specify the appearance of said overlay images and means for storing said database.

19. The system of claim 17 further comprising means for developing said database including an interactive tool for providing a graphical user interface during development of said database.

20. The system of claim 17 further comprising:
a touch sensitive screen responsive to touching particular areas of said screen for transmitting a signal to said host computer; and
means for altering the appearance of said overlay images in response to said touching.

* * * * *